United States Patent
Milz et al.

(10) Patent No.: US 9,836,837 B2
(45) Date of Patent: Dec. 5, 2017

(54) METHOD AND DEVICE FOR DETERMINING A TRANSFORMATION BETWEEN TWO IMAGES OF AN ANATOMICAL STRUCTURE

(71) Applicant: Brainlab AG, Munich (DE)

(72) Inventors: Stefan Milz, Saalburg-Ebersdorf (DE); Johannes Flake, Munich (DE)

(73) Assignee: Brainlab AG, Munich (DE)

( * ) Notice: Subject to any disclaimer, the term of this patent is extended or adjusted under 35 U.S.C. 154(b) by 3 days.

(21) Appl. No.: 15/100,965

(22) PCT Filed: Dec. 2, 2013

(86) PCT No.: PCT/EP2013/075277
§ 371 (c)(1),
(2) Date: Jun. 1, 2016

(87) PCT Pub. No.: WO2015/081978
PCT Pub. Date: Jun. 11, 2015

(65) Prior Publication Data
US 2016/0300346 A1    Oct. 13, 2016

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/6202* (2013.01); *G06T 7/344* (2017.01); *G06T 2207/30061* (2013.01)

(58) Field of Classification Search
CPC ....... G06T 7/0012; G06T 7/344; G06T 7/149; G06T 7/251; G06T 2207/30061; G06K 9/6202; A61B 2034/108
See application file for complete search history.

(56) References Cited

U.S. PATENT DOCUMENTS

| | | | | |
|---|---|---|---|---|
| 7,257,244 | B2 * | 8/2007 | Miga | G06T 7/0012 382/128 |
| 7,738,683 | B2 * | 6/2010 | Cahill | G06T 7/0012 382/128 |

(Continued)

OTHER PUBLICATIONS

European Patent Office, International Search Report for PCT/EP2013/075277 dated Jul. 28, 2014.
(Continued)

*Primary Examiner* — Ali Bayat
(74) *Attorney, Agent, or Firm* — Middleton Reutlinger

(57) ABSTRACT

An image transformation method, performed by a computer, for determining a transformation between two medical images of an anatomical structure, respectively taken at a first and second point in time, said method comprising the steps of: acquiring first and second image datasets which represent the first and second image, respectively; determining an image-based transformation between the first image and the second image; acquiring an elastic model of the anatomical structure at the first point in time, wherein the elastic model comprises a plurality of nodes and the relationships between the nodes; calculating the displacements of a subset of the nodes in accordance with the image-based transformation; calculating the displacements of the other nodes in accordance with the relationships between the nodes as represented by the elastic model, while keeping the displacements of the nodes in the subset of nodes constant; and calculating the transformation from the displacement vectors which represent the displacements of the nodes as compared to their positions at the first point in time.

17 Claims, 4 Drawing Sheets

Figures 1A, 1B:
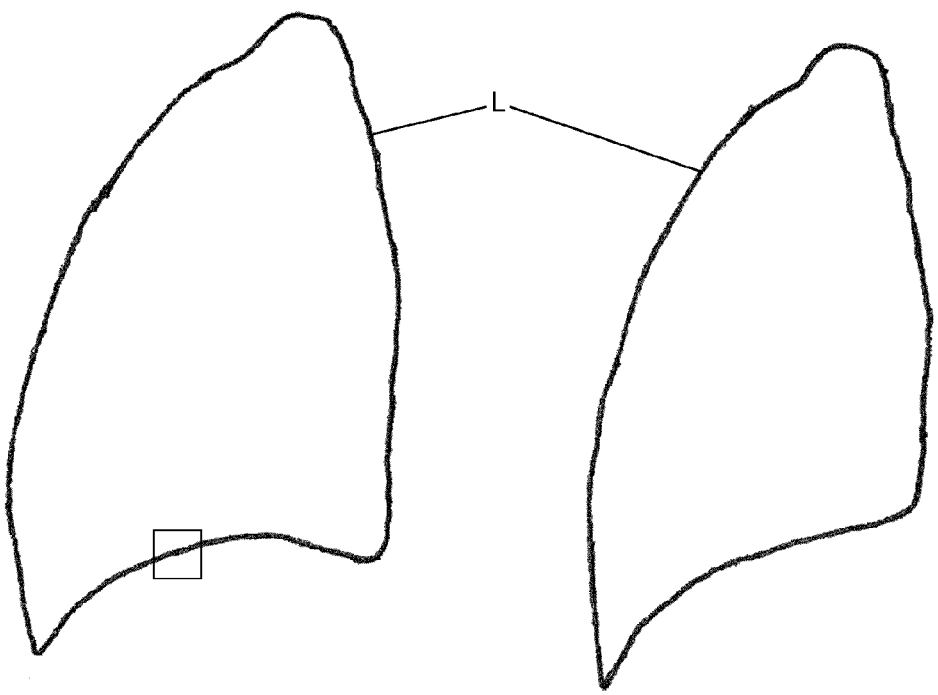

(51) Int. Cl.
G06K 9/62 (2006.01)
G06T 7/33 (2017.01)

(56) References Cited

U.S. PATENT DOCUMENTS

| | | | |
|---|---|---|---|
| 8,165,359 B2* | 4/2012 | Dewaele | G06T 7/0012 |
| | | | 382/128 |
| 8,666,128 B2* | 3/2014 | Chaney | G06K 9/621 |
| | | | 382/128 |
| 9,375,184 B2* | 6/2016 | Boettger | A61B 5/7275 |
| 9,636,075 B2* | 5/2017 | Lee | G06T 7/0012 |
| 2004/0227761 A1 | 11/2004 | Anderson et al. | |
| 2010/0295848 A1 | 11/2010 | Grewer et al. | |
| 2011/0153286 A1 | 6/2011 | Zaeuner et al. | |
| 2013/0197881 A1* | 8/2013 | Mansi | G06F 17/5009 |
| | | | 703/2 |

OTHER PUBLICATIONS

Pan Li et al., Combination of intensity-based image registration with 3D simulation in radiation therapy; Combination of intensity-based image registration with 3D simulation, Physics in Medicine and Biology, Institute of Physics Publishing, Bristol, vol. Sep. 7, 2008.

F.P. Vidal et al., Principles and Applications of Computer Graphics in Medicine, Computer Graphics Forum, vol. 25, No. 1 Mar. 1, 2006.

Aristeidis Sotiras et al., Deformable Medical Image Registration: A Survey, IEEE Transactions on Medical Imaging, IEEE Service Center, Piscataway, NJ, vol. 32, No. 7 Jul. 1, 2013.

* cited by examiner

METHOD AND DEVICE FOR DETERMINING A TRANSFORMATION BETWEEN TWO IMAGES OF AN ANATOMICAL STRUCTURE

The present invention relates to a data processing method, performed by a computer, and a device for determining a transformation between two medical images of an anatomical structure, respectively taken at a first and second point in time.

Taking a sequence of two or more medical images of an anatomical structure in order to observe the anatomical structure over time is a known measure which is particularly useful when planning a radiotherapy treatment for a part of the anatomical structure, because changes in the anatomical structure may displace an object which is to be treated. Some applications require a transformation between two of the images from the sequence of medical images of the anatomical structure. Several approaches for determining this transformation using algorithms, such as rigid or elastic image fusion, are known. However, these known approaches may lead to inadequate results, in particular if there are large homogeneous areas in the images.

It is therefore an object of the present invention to provide an improved method and device for determining a transformation between two medical images. This object is achieved by the subject-matter of the independent claims. Advantageous embodiments are defined in the dependent claims.

The present invention relates to a data processing method, performed by a computer, for determining a transformation between two medical images of an anatomical structure, respectively taken at a first and second point in time. The method comprises the step of acquiring first and second image datasets which represent a first and second image, respectively. The image datasets are preferably 2D or 3D image datasets, in particular depending on the imaging modality used for recording the images, wherein X-ray imaging typically produces two-dimensional images, while other imaging modalities such as magnetic resonance imaging (MRI) or computed tomography (CT) produce three-dimensional images. The first and second image can be images within a sequence of images, such as for example individual 3D images from a 4D CT image sequence. The first and second datasets can be part of a single, common dataset. The first and second points in time are not identical.

The first and second images are preferably taken from the same imaging direction onto the patient, and in particular onto the anatomical structure, at both the first and second points in time. This is for example the case if the first and second images are consecutively recorded in one imaging process, such as for example a 4D CT imaging process. If the two images are not taken from the same viewing direction, then the two images are aligned before any subsequent steps are performed.

The method also comprises the step of determining an image-based transformation between the first image and the second image. The image-based transformation is preferably based on the image datasets alone, i.e. the image information alone, without applying any knowledge of the anatomical structure shown in the images. Determining the image-based transformation in particular means calculating the image-based transformation. The calculated image-based transformation preferably only represents the shift in image units, i.e. pixels or voxels, between the first image and the second image. Any suitable image analysis algorithm can be used for calculating the image-based transformation, such as for example known algorithms for elastic image fusion.

Numerous different algorithms for calculating an image-based transformation are known and available. In a preferred embodiment, the type of algorithm is selected in accordance with the type of anatomical structure, such that the most suitable algorithm for a particular set of images is selected. However, the algorithm for calculating the image-based transformation does not itself utilise any additional information about the anatomical structure, but is rather merely applied to the image datasets.

The method also comprises the step of acquiring an elastic model of the anatomical structure at a first point of time, wherein the elastic model comprises a plurality of nodes and the relationships between the nodes. The elastic model therefore represents the anatomical structure, and in particular the contour of the anatomical structure, at the first point in time. Preferably, the elastic model is tailored to the anatomical structure it represents, such as a lung or a liver. The relationships between the nodes reflect how displacing one or more nodes causes one or more other nodes to be displaced.

The method also comprises the step of calculating displacements of a subset of the nodes of the elastic model in accordance with the image-based transformation. The subset of nodes preferably does not comprise all the nodes of the elastic model but rather only some of the nodes. As explained above, the image-based transformation represents the shift in the pixels or voxels between the first image and the second image. Calculating the displacements of a subset of the nodes in accordance with the image-based transformation means calculating the displacement of a node between the first point in time and the second point in time from the shift in at least one (corresponding) pixel or voxel between the first image and the second image. In other words, the nodes in the subset of the nodes of the elastic model are displaced in an analogous way to the corresponding pixel(s) or voxel(s).

The method also comprises the step of calculating the displacements of the other nodes in accordance with the relationships between the nodes as represented by the elastic model, while the displacements of the nodes in the subset of nodes are kept constant. When the nodes in the subset of nodes are displaced, as calculated in the preceding step, the relationships between the nodes cause the other nodes to be displaced in accordance with the displacement of the nodes within the subset of nodes and the relationships between all the nodes. Calculating the displacement of the other nodes is in particular an iterative process dependent on the type of elastic model used. In other words, the fixed displacement of the nodes in the subset of nodes is used as a constraint for calculating the arrangement of the other nodes. A displacement is defined by a direction and a magnitude and can therefore be represented by a displacement vector.

In this document, the displacement of a node means a virtual change of the node's position. The displacements of all the nodes represent the change of the elastic model of the anatomical structure from the first point in time to the second point in time.

The method also comprises the step of calculating the transformation from the displacement vectors which represent the displacements of the nodes as compared to their positions at the first point in time. The displacement of each of the nodes has been calculated in the preceding steps. Each displacement is represented by a displacement vector which starts at the position of the respective node at the first point in time and ends at the position of the same node at the second point in time. As a result, each displacement vector represents the displacement of at least a region of the anatomical structure between the first and second point in time and therefore the displacement experienced by the pixels, voxels or clusters of at least the region of the anatomical structure between the first medical image and the second medical image, wherein a "cluster" is a set of preferably adjacent pixels or voxels which experience the same displacement.

In short, the method according to the present invention implements a hybrid approach for determining a transformation between medical images. In a first part of this hybrid approach, an image-based transformation is calculated which is then used to calculate the displacements, also referred to as shifts, experienced by at least a subset of nodes from an elastic model of the anatomical structure. The elastic model is then used to calculate the displacements or shifts experienced by the other nodes, from the fixed displacements experienced by the subset of nodes. This approach has several advantages. A first advantage is that it increases the robustness of the transformation by avoiding a purely image-based transformation which can fail if the two images comprise large homogenous portions. It is then in many cases no longer possible to calculate the shift in the voxels or pixels unambiguously. This ambiguity is resolved by the present invention using the elastic model which represents the relationships between the nodes and therefore between the pixels or voxels. A second advantage is that the elastic model comprises information about the structure of the anatomical structure and therefore introduces background knowledge of the anatomical structure into the transformation.

In a preferred embodiment, the method also comprises the step of aligning the elastic model with the first image, wherein this step is performed between the steps of acquiring the elastic model and calculating the displacements of the subset of nodes. In this additional step, the first image and the elastic model are made mutually congruent such that the elastic model represents the anatomic structure as it is shown in the first image.

In one embodiment, the subset of nodes comprises the nodes which exhibit a displacement which is larger than a predetermined threshold. As described above, the displacement of a node is calculated from the image-based transformation and in particular from the shift or shifts in at least one pixel or voxel which has a position in the first medical image which corresponds to the position of the node. Nodes which exhibit a magnitude of displacement which is larger than the predetermined threshold are selected for inclusion in the subset of nodes. The displacement of the remaining nodes, i.e. the nodes which exhibit a magnitude of displacement which is below the predetermined threshold, are calculated using the elastic model.

The displacements of the nodes in the subset of nodes are maintained, i.e. kept unchanged, while the displacements of the other nodes are calculated using the elastic model. In order to calculate the displacements of the other nodes, their initial displacements can be calculated by being set to zero or equally by being calculated in accordance with the image-based transformation, i.e. in the same way as the displacements of the nodes in the subset of nodes, and the displacements of said other nodes can then be calculated from the initial displacements using the elastic model.

In one embodiment, the subset of nodes comprises 10% or less of the total number of nodes in the elastic model. This means that the displacements of 10% or less of the nodes are maintained, while the displacements of 90% or more of the nodes are calculated using the elastic model.

In one embodiment, the subset of nodes comprises nodes on the surface of the anatomical structure only. Since there is a finite number of nodes, both nodes located exactly on the surface of the anatomical structure and nodes at a distance from the surface of the anatomical structure which is smaller than a predetermined distance threshold are considered to be on the surface. This distance threshold can be the average distance between the nodes in the elastic model or a particular fraction of the average distance between the nodes in the elastic model. In this embodiment, only nodes which represent the outer shape of the anatomical structure, i.e. its surface, exhibit a fixed displacement calculated from the image-based transformation, while the nodes located in the interior of the anatomical structure are displaced freely in accordance with the elastic model.

As outlined above, the elastic model comprises a plurality of nodes and the relationships between the nodes. The relationships between the nodes in particular describe the influence of the movement of one or more nodes on one or more of the other nodes. In one embodiment, the nodes are mass points and the relationship between the nodes is represented by springs between neighbouring nodes. The elastic model is then a so-called spring mass model.

If the nodes are in equilibrium and one or more of the nodes are then displaced, this displacement propagates through the elastic model because the springs between the displaced nodes on the one hand and one or more of their neighbouring nodes on the other hand cause these latter neighbouring nodes to be displaced. The displacement propagates through the elastic model until an equilibrium is once again reached. As outlined above, the displacement of the nodes in the subset of nodes is used as an ancillary condition for calculating the new equilibrium. The positions of the displaced nodes from the subset of nodes remain fixed, while the positions of the other nodes are calculated on the basis of the elastic model. The nodes are in equilibrium if the resulting forces on each of the nodes caused by all the springs connected to each node are zero.

In one embodiment, the elastic model comprises a grid of equidistant nodes. It is therefore possible to create a generic grid of nodes for the anatomical structure at the first point in time, in particular by fitting the grid to the contour of the anatomical structure as shown in the first image.

In one embodiment, the elastic model represents different kinds of tissue within the anatomical structure. This means that the properties of the nodes and their relationships depend on the positions of the nodes within the elastic model, specifically on the type of tissue at the position of the respective node. If the nodes are mass points and the relationships between nodes are represented by springs, then the mass of a node depends on the type of tissue at the position of said node, and the spring properties depend on the interaction between tissue at the position of the node and tissue at the position of neighbouring nodes.

In this document, nodes are considered to be neighbouring if the displacement of a node has a direct influence on the position of another node, i.e. without the presence and mediation of an intermediate node which is moved by the displacement of the first node and in turn causes another node to be displaced. In the case of a spring mass model, all the nodes which are directly connected to a particular node by a spring are neighbouring nodes with respect to said latter node.

In one embodiment, the image-based transformation is calculated by motion estimation. Motion estimation is well-known in image processing, both for two-dimensional and three-dimensional images. In general, motion estimation calculates the displacement of a single pixel or voxel or a cluster of pixels or voxels between one image and another and provides a transformation vector which represents this displacement. The image-based transformation is then the entirety of all the displacements respectively experienced by all the pixels or voxels in the image. The image-based transformation is then preferably a vector field. This vector field preferably represents one transformation vector for each of the pixels or voxels in the first image. In this document, the expression "each pixel or voxel" preferably means all the pixels or voxels in the first image which represent the anatomical structure, since pixels or voxels which do not represent the anatomical structure are unlikely to be important in any application of the present invention.

In one embodiment, the displacement of a node from the subset of nodes is calculated by interpolating transformation vectors of the vector field for which the initial points surround the node. In other words, pixels or voxels which correspond to one of these nodes are determined in accordance with their position relative to the node. The transformation vectors of these pixels or voxels in the image-based transformation are then interpolated in order to determine the displacement of the node. Interpolating the vectors can comprise applying weightings to the vectors to be interpolated. If a node is located at the centre of a pixel or voxel, then the displacement of the nodes is preferably equal to the displacement vector for this pixel or voxel.

In one embodiment, determining the transformation from the displacement vectors simply involves providing the entirety of the displacement vectors as the transformation.

In another embodiment, determining the transformation from the displacement vectors involves calculating a displacement vector field from the displacement vectors by interpolation and providing the displacement vector field as the transformation. In general, the nodes of the elastic model for the first image at the first point in time can be distributed arbitrarily. This means that the displacement vectors, in particular their base points, are distributed irregularly within the area or volume occupied by the anatomical structure in the first image at the first point in time. In this embodiment, a displacement vector field in which the base points of the vectors preferably exhibit a regular distribution is calculated from the (irregularly distributed) displacement vectors. Preferably, the displacement vector field comprises one displacement vector for each pixel or voxel of the first image, wherein the base point of each displacement vector is preferably located centrally within the respective pixel or voxel.

In one embodiment, nodes are selected for inclusion in the subset of nodes on the basis of an atlas of the anatomical structure. The atlas is acquired and preferably matched to the first image in order to align the atlas with the first image and in particular with the anatomical structure shown in the first image. The atlas then indicates the nodes which are to be selected for inclusion in the subset of nodes and then kept fixed or constant while the elastic model as described above is applied. Instead of indicating nodes, the atlas can also indicate one or more volumes, wherein all the nodes located within said volume(s) are then preferably selected for inclusion in the subset of nodes.

Determining the image-based transformation between the first and second images typically involves calculating the image-based transformation, in particular by analysing the two images. Determining the image-based transformation can however also involve acquiring a pre-calculated image-based transformation from an atlas. If the change in the anatomical structure is a common change, such as the deformation of a heart as it beats or the deformation of a lung with each breath taken, then the image-based transformation can be pre-calculated and start together with the atlas. The pre-calculated image-based transformation can then be used for calculating the displacements of the nodes of the subset of nodes in the elastic model.

The present invention also relates to a program which, when running on a computer, causes the computer to perform the method steps of the method described above and/or to a program storage medium on which the program is stored and/or to a computer comprising said program storage medium and/or to a signal wave, in particular a digital signal wave, carrying information which represents the program.

The present invention also relates to a device for determining a transformation between two medical images of an anatomical structure, respectively taken at a first and second point in time, wherein said device comprises a computer onto which the aforementioned program is loaded.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements, and optionally a volatile memory (in particular a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which in particular comprises technical, in particular tangible components, in particular mechanical and/or electronic components. Any device mentioned as such in this document is a technical and in particular tangible device.

An atlas typically consists of a plurality of generic models of objects, such as anatomical structures, wherein the generic models of the objects together form a complex structure. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

The method in accordance with the invention is in particular a data processing method. The data processing method is preferably performed using technical means, in particular a computer. The data processing method is preferably constituted to be executed by or on a computer and in particular is executed by or on the computer. In particular, all the steps or merely some of the steps (i.e. less than the total number of steps) of the method in accordance with the invention can be executed by a computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. In particular, the term "cloud" is used in this respect as a metaphor for the Internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or which are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer.

The expression "acquiring data" in particular encompasses (within the framework of a data processing method) the scenario in which the data are determined by the data processing method or program. Determining data in particular encompasses measuring physical quantities and transforming the measured values into data, in particular digital data, and/or computing the data by means of a computer and in particular within the framework of the method in accordance with the invention. The meaning of "acquiring data" also in particular encompasses the scenario in which the data are received or retrieved by the data processing method or program, for example from another program, a previous method step or a data storage medium, in particular for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are in particular detected or captured (for example by an analytical device). Alternatively or additionally, the data are inputted in accordance with the additional step, for instance via interfaces. The data generated can in particular be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, in particular determining data, does not involve a surgical step and in particular does not involve a step of treating a human or animal body using surgery or therapy. In order to distinguish the different data used by the present method, the data are denoted (i.e. referred to) as "XV data" and the like and are defined in terms of the information which they describe, which is then preferably referred to as "XY information" and the like.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

Elastic fusion transformations (for example, elastic image fusion transformations) are in particular designed to enable a seamless transition from one dataset (for example a first dataset such as for example a first image) to another dataset (for example a second dataset such as for example a second image). The transformation is in particular designed such that one of the first and second datasets (images) is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are in particular vectors of a deformation field. These vectors are determined by the optimisation algorithm in such a way as to result in an optimum degree of similarity. Thus, the optimum degree of similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), in particular in order to avoid pathological deformations (for instance, all the voxels being shifted to the same position by the transformation). These constraints include in particular the constraint that the transformation is regular, which in particular means that a Jacobian determinant calculated from a matrix of the deformation field (in particular, the vector field) is larger than zero, and also the constraint that the transformed (deformed) image is not self-intersecting and in particular that the transformed (deformed) image does not comprise faults and/or ruptures. The constraints include in particular the constraint that if a regular grid is transformed simultaneously with the image and in a corresponding manner, the grid is not allowed to interfold at any of its locations. The optimising problem is in particular solved iteratively, in particular by means of an optimisation algorithm which is in particular a first-order optimisation algorithm, in particular a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there are a plurality of local optima, global algorithms such as simulated annealing or generic algorithms can be used. In the case of linear optimisation problems, the simplex method can for instance be used.

In the steps of the optimisation algorithms, the voxels are in particular shifted by a magnitude in a direction such that the degree of similarity is increased. This magnitude is preferably less than a predefined limit, for instance less than one tenth or one hundredth or one thousandth of the diameter of the image, and in particular about equal to or less than the distance between neighbouring voxels. Large deformations can be implemented, in particular due to a high number of (iteration) steps.

The determined elastic fusion transformation can in particular be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can in particular be determined on the basis of a determined correlation between the first and second datasets.

It is within the scope of the present invention to combine one or more features of one or more embodiments in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can in particular be added to said other embodiment.

Figure 2:
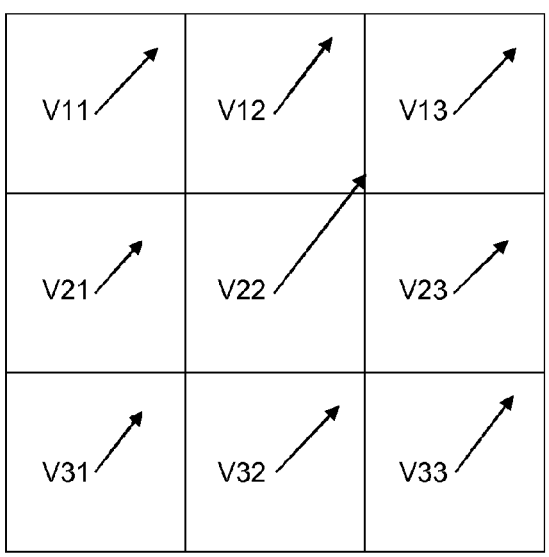
Figure 3:
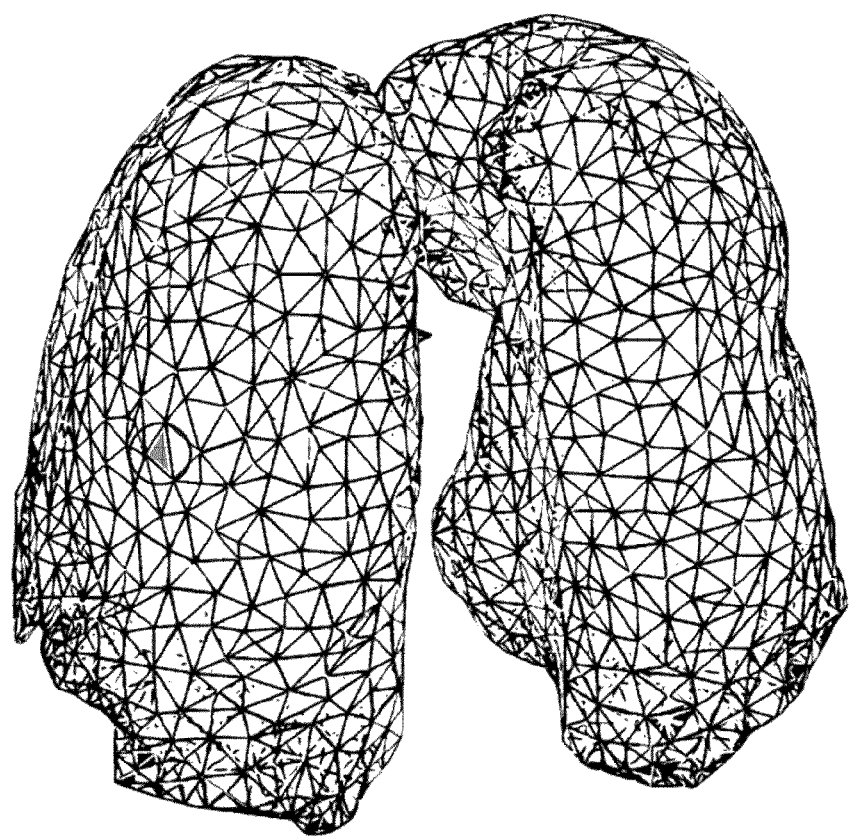
Figure 4:
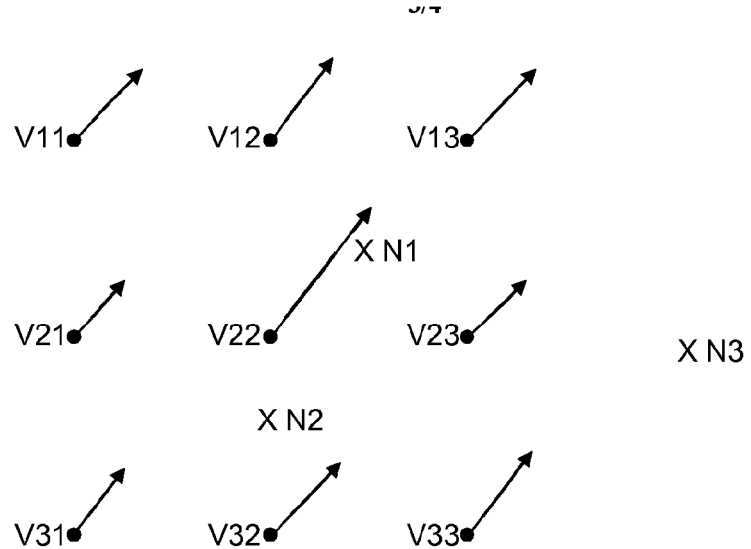
Figure 5:
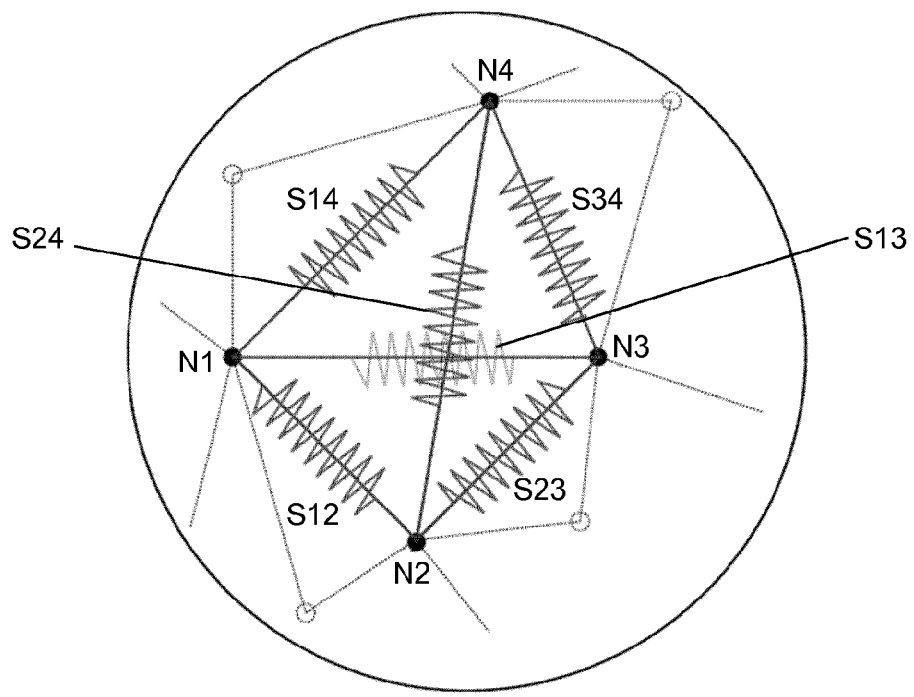

In the following, an example embodiment of the invention is described with reference to the figures, which illustrate the invention merely by way of example and do not limit the scope of the invention to the specific embodiment illustrated, and which show:

FIGS. 1a and 1b images of the contours of a lung in two aspiration states, i.e. at two different points in time;

FIG. 2 voxels from the image in FIG. 1a, with transformation vectors of an image-based transformation;

FIG. 3 an elastic model of the lungs;

FIG. 4 the voxels from FIG. 2, with additional nodes from the elastic model;

FIG. 5 details of the elastic model; and

Figure 6:
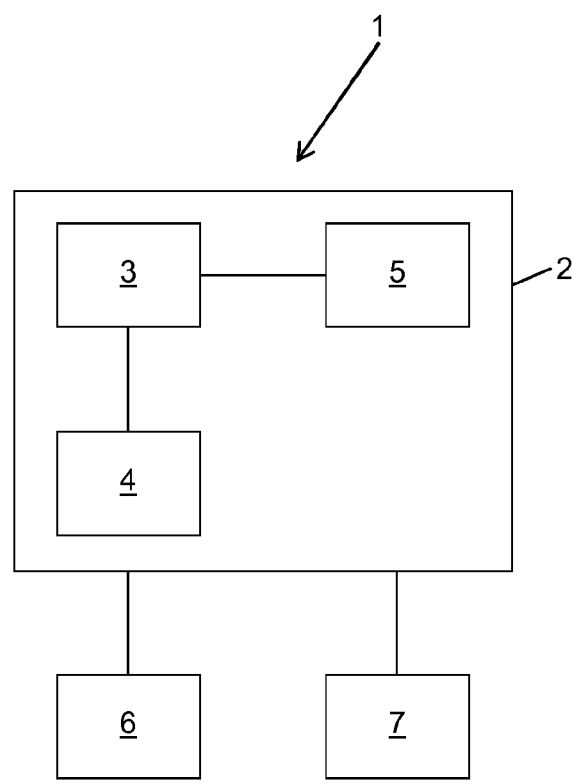

FIG. 6 a system for carrying out the method according to the invention.

FIGS. 1a and 1b show a simplified representation of two medical images of a lung L, as an example of an anatomical structure. While FIGS. 1a and 1b only show the contour of the lung, the first and second images would in practice actually be three-dimensional greyscale images. The medical images are for example part of a 4D CT dataset, i.e. a temporal sequence of three-dimensional CT images. The images are represented by separate image datasets, although the images can equally be stored in a single, common dataset.

Once the first and second image datasets, which respectively represent the first and second images, have been acquired, an image-based transformation between the first and second images is calculated. In this example, the image-based transformation is calculated by performing elastic image fusion between the first image and the second image. This transformation is based only on the information stored in the image datasets, i.e. on the greyscale values only, and does not utilise any additional information about the structure of the lung.

FIG. 2 shows some example voxels of the first image within the box shown in FIG. 1a. Each voxel represents a greyscale value in a sub-volume of the image volume. The image-based transformation represents the displacement experienced by each voxel of the first image. If the image-based transformation is applied to the first image shown in FIG. 1a, the result is the second image shown in FIG. 1b. FIG. 2 shows transformation vectors V11 to V33 for nine voxels.

FIG. 3 shows an elastic model of a pair of lungs. The elastic model comprises a plurality of nodes and the relationships between the nodes. The nodes are distributed over the volume of the anatomical structure. The elastic model is acquired and then aligned with the first image dataset, such that it represents the lung L at the first point in time, i.e. the elastic model represents the anatomical structure as it is shown in the first image.

FIG. 4 shows nine points representing the centres of the voxels from FIG. 2 and three crosses representing the positions of three nodes N1, N2 and N3 of the elastic model. If the elastic model is to represent the lung L at the second point in time, then the nodes have to be displaced relative to their positions at the first point in time. In the present embodiment, the displacements to be applied to the nodes are calculated from the image-based transformation. The displacement to be applied to the node N1 is calculated as the average of the transformation vectors V12, V13, V22 and V23. The displacement to be applied to the node N2 is calculated as the average of the transformation vectors V22 and V32, and so on.

In a following step, the magnitudes of the displacements of the nodes are analysed. Nodes which exhibit a magnitude of displacement which is larger than a predetermined threshold are selected for inclusion in a subset of nodes. Of the nodes shown in FIG. 4, only the node N1 exhibits a magnitude of displacement which is above the threshold, such that the node N1 is selected for inclusion in the subset of nodes, while the nodes N2 and N3 are not selected for inclusion in the subset of nodes.

Details of the elastic model are shown in FIG. 5. As can be seen from this figure, each node has a mass point and is connected to one or more adjacent nodes via a respective spring. In the present embodiment, the same mass is assigned to each of the nodes, and the springs in the elastic model all have the same properties. It is however possible to adapt the masses of the nodes and the properties of the springs to the properties of the tissue of the anatomical structure.

In the part of the elastic model shown in FIG. 5, the spring S12 connects the nodes N1 and N2, the spring S13 connects the nodes N1 and N3, the spring S14 connects the nodes N1 and N4, the spring S23 connects the nodes N2 and N3, the spring S24 connects the nodes N2 and N4, and the spring S34 connects the nodes N3 and N4.

As explained above, the node N1 is selected for inclusion in the subset of nodes, while the nodes N2 and N3 are not. The displacements of the nodes which have been incorporated into the subset of nodes are kept constant, while the displacements of the other nodes are calculated in accordance with the elastic model. Due to the relationships between the nodes, displacing the node N1 causes the nodes N2, N3 and N4 to also be displaced. The displacement of the node N1 therefore propagates through the elastic model until all the nodes are once again in equilibrium. This propagation can be calculated, for example iteratively, in ways already known in the prior art. The distribution of the nodes with which the first iteration starts can be a distribution in which the nodes within the subset of nodes are displaced in accordance with their displacements and the other nodes are not displaced or a distribution which represents the calculated displacements of all the nodes.

In other words, displacing the nodes within the subset of nodes disturbs the equilibrium exhibited by the elastic model as acquired for the first point in time. Calculating the displacements of the other nodes therefore means calculating how the elastic model relaxes until all the nodes, such as the mass points and their interconnecting springs, are once again in equilibrium.

In the present example, the displacements are calculated for all the nodes on the basis of the image-based transformation, and the nodes are then segmented into the subset of nodes and the remaining nodes. Depending on how the nodes are selected for inclusion in the subset of nodes, this selection process may be performed before or after the displacements are calculated. If, for example, only nodes on the contour of the anatomical structure L are selected for inclusion in the subset of nodes, then the displacements can all be calculated after the selection process.

Once the displacements of the nodes within the subset of nodes have been calculated from the image-based transformation and the displacement of all the other nodes have been calculated from the elastic model, the displacements of all the nodes are known. This set of displacements thus represents all the displacements, or shifts, of a plurality of points within the anatomical structure between the first point in time and the second point in time. The displacement vectors which represent the displacements of the nodes can then be collectively used as the transformation between the two medical images of the lung.

The transformation then comprises a plurality of displacement vectors, the base points of which exhibit the same distribution as the nodes of the elastic model at the first point in time. However, the transformation may be more intelligible if it is represented by a displacement vector field which exhibits a uniform distribution of the base points of the vectors. This example therefore includes the optional steps of calculating a displacement vector field from the displacement vectors, for example by interpolating the displacement vectors, and then using and in particular providing the displacement vector field as the transformation field. The base points of the vectors in the displacement vector field are preferably located at the centres of the voxels of the first image.

FIG. 6 schematically shows a system 1 for carrying out the method described above. The system 1 comprises a computer 2 which is connected to an input unit 6, such as a keyboard, and to a display unit 7, such as a monitor. The computer 2 comprises a processing unit 3 (such as a central processing unit or CPU) which is connected to a memory unit 4 and an interface 5. The CPU 3 can acquire data, such as the medical images and the elastic model, via the interface 5. The memory unit 4 stores a program code to be executed by the processing unit 3 and optionally also stores any data received via the interface 5. The processing unit 3 is adapted to execute the code stored in the memory unit 4, such that the processing unit 3 carries out the method steps described above.

The invention claimed is:
1. An image transformation method, performed by a computer, for determining a transformation between two medical images of an anatomical structure (L), respectively taken at a first and second point in time, said method comprising the steps of:
a) acquiring first and second image datasets which represent the first and second image, respectively;
b) determining an image-based transformation (V) between the first image and the second image;
c) acquiring an elastic model of the anatomical structure (L) at the first point in time, wherein the elastic model comprises a plurality of nodes (N1-N4) and the relationships between the nodes (N1-N4);
d) calculating the displacements of a subset of the nodes (N1) in accordance with the image-based transformation;
e) calculating the displacements of the other nodes (N2-N4) in accordance with the relationships between the nodes (N1-N4) as represented by the elastic model while keeping the displacements of the nodes in the subset of nodes (N1) constant; and
f) calculating the transformation from the displacement vectors which represent the displacements of the nodes (N1-N4) as compared to their positions at the first point in time.

2. The method according to claim 1, further comprising the step of aligning the elastic model with the first image, wherein this step is performed between steps c) and d).

3. The method according to claim 1, wherein the subset of nodes (N1) comprises the nodes which exhibit a displacement which is larger than a predetermined threshold.

4. The method according to claim 1, wherein the subset of nodes (N1) comprises 10% or less of the total number of nodes in the elastic model.

5. The method according to claim 1, wherein the subset of nodes (N1) comprises nodes on the surface of the anatomical structure (L) only.

6. The method according to claim 1, wherein the nodes (N1-N4) are mass points and the relationship between the nodes is represented by springs (S) between neighbouring nodes.

7. The method according to claim 1, wherein the elastic model comprises a grid of equidistant nodes.

8. The method according to claim 1, wherein the elastic model represents different kinds of tissue within the anatomical structure (L).

9. The method according to claim 1, wherein the image-based transformation (V) is calculated by motion estimation.

10. The method according to claim 1, wherein the image-based transformation (V) is a vector field.

11. The method according to claim 10, wherein the displacement of a node (N1) from the subset of nodes is calculated by interpolating the vectors of the vector field (V) for which the initial points surround the node (N1).

12. The method according to claim 1, wherein calculating the transformation from the displacement vectors involves calculating a displacement vector field from the displacement vectors by interpolation and using or in particular providing the displacement vector field as the transformation.

13. The method according to claim 1, wherein nodes are selected for inclusion in the subset of nodes (N1) on the basis of an atlas of the anatomical structure (L).

14. An image transformation system, comprising:
at least one computer having at least one processor and associated memory, the memory having computer instructions stored thereon, the instructions, when executed by the processor, causes the computer to:
acquire first and second images which represent an anatomical structure at a respective first point in time and a second point in time;
determine a transformation between the first image and the second image;
acquire a model of the anatomical structure at the first point in time, the model includes a plurality of nodes and the relationships between the nodes and represents different kinds of tissue within the anatomical structure;
calculate the displacements of a first subset of nodes of the plurality of nodes in accordance with the transformation;
calculate the displacements of the remaining nodes of the plurality of nodes in accordance with the relationships between the nodes as represented by the model while keeping the displacements of the nodes in the first subset of nodes constant;
determine the displacement of the plurality of nodes from the first point in time to the second point in time to create a plurality of displacement vectors; and
calculate the transformation from the displacement vectors.

15. The image transformation system of claim 14 wherein the memory has further instructions stored thereon, the instructions, when executed by the processor, causes the computer to calculate the transformation from the displacement vectors by providing the plurality of displacement vectors as the transformation.

16. The image transformation system of claim 14 wherein the memory has further instructions stored thereon, the instructions, when executed by the processor, causes the computer to calculate a displacement vector field from the plurality of displacement vectors by interpolation.

17. A computer implemented image transformation method for determining a transformation between a first medical image and a second medical image of an anatomical structure, respectively taken at a first point in time and second point in time, comprising:
acquiring the first and second image;
determining an image-based transformation between the first image and the second image;
acquiring a model of the anatomical structure at the first point in time, wherein the model comprises a plurality of nodes and relationships between the nodes, the model representing the contour of the anatomical structure;
calculating the displacements of a subset of the nodes in accordance with the image-based transformation;
calculating the displacements of the other nodes in accordance with the relationships between the nodes as represented by the model while keeping the displacements of the nodes in the subset of nodes constant;
calculating the transformation from the displacement vectors which represent the displacements of the nodes as compared to their positions at the first point in time.

* * * * *